United States Patent
De Lombaerde

(10) Patent No.: US 11,035,650 B2
(45) Date of Patent: Jun. 15, 2021

(54) FLEXIBLE, LIGHTWEIGHT ANTIBALLISTIC PROTECTION

(71) Applicant: Seyntex N.V., Tielt (BE)

(72) Inventor: Bart De Lombaerde, Tielt (BE)

(73) Assignee: Seyntex N.V., Tielt (BE)

(*) Notice: Subject to any disclaimer, the term of this patent is extended or adjusted under 35 U.S.C. 154(b) by 211 days.

(21) Appl. No.: 16/302,538

(22) PCT Filed: May 19, 2017

(86) PCT No.: PCT/IB2017/052965
§ 371 (c)(1),
(2) Date: Nov. 16, 2018

(87) PCT Pub. No.: WO2017/199213
PCT Pub. Date: Nov. 23, 2017

(65) Prior Publication Data
US 2019/0170483 A1    Jun. 6, 2019

(30) Foreign Application Priority Data

May 19, 2016 (BE) .................................. 2016/5368

(51) Int. Cl.
*F41H 1/02* (2006.01)
*F41H 5/04* (2006.01)

(52) U.S. Cl.
CPC ............ *F41H 1/02* (2013.01); *F41H 5/0478* (2013.01); *F41H 5/0485* (2013.01); *B32B 2571/02* (2013.01)

(58) Field of Classification Search
CPC combination set(s) only.
See application file for complete search history.

(56) References Cited

U.S. PATENT DOCUMENTS

| 6,103,646 A | 8/2000 | Chiou |
| 6,233,737 B1 | 5/2001 | Ditchfield et al. |
| 7,958,812 B2 | 6/2011 | Wang et al. |
| 2009/0255022 A1 | 10/2009 | Smith et al. |
| 2009/0311930 A1 | 12/2009 | Wang et al. |
| 2010/0058507 A1 | 3/2010 | Schultz |

(Continued)

FOREIGN PATENT DOCUMENTS

| CN | 101709932 A | 5/2010 |
| CN | 203940789 U | 11/2014 |

(Continued)

OTHER PUBLICATIONS

International Search Report for PCT Application No. PCT/IB2017/052965 dated Aug. 9, 2017 in 3 pages.

*Primary Examiner* — Arti Singh-Pandey
(74) *Attorney, Agent, or Firm* — Knobbe, Martens, Olson & Bear, LLP

(57) ABSTRACT

The present invention relates to an antiballistic protection comprising a cover with a stab and bullet resistant layer, comprising a stab resistant layer and a bullet resistant layer, in which said antiballistic protection has a large flexibility. Preferably, said stab and bullet resistant layer comprises a stab resistant layer of polyamide and a bullet resistant layer of ultra-high molecular weight polyethylene.

The invention also relates to a method for fabricating said antiballistic protection as well as the use of pieces of clothing.

16 Claims, 5 Drawing Sheets

(56) References Cited

U.S. PATENT DOCUMENTS

| | | | |
|---|---|---|---|
| 2011/0005379 A1 | 1/2011 | Wang et al. | |
| 2012/0128947 A1* | 5/2012 | Bohringer | F41H 1/02 |
| | | | 428/198 |
| 2012/0180176 A1 | 7/2012 | Neal | |
| 2012/0196108 A1 | 8/2012 | Bhatnagar et al. | |
| 2014/0087124 A1* | 3/2014 | Carbajal | B32B 5/022 |
| | | | 428/111 |
| 2014/0248463 A1* | 9/2014 | Tam | C08J 5/04 |
| | | | 428/113 |
| 2014/0302274 A1* | 10/2014 | Tam | D03D 1/0052 |
| | | | 428/113 |
| 2016/0159034 A1* | 6/2016 | Bhatnagar | B32B 5/08 |
| | | | 428/212 |

FOREIGN PATENT DOCUMENTS

| | | |
|---|---|---|
| CN | 205156750 U | 3/2016 |
| EP | 1627719 B1 | 2/2006 |
| EP | 1908586 A1 | 4/2008 |
| EP | 2199727 A1 | 6/2010 |
| WO | 98/17136 A1 | 4/1998 |
| WO | 00/37876 A1 | 6/2000 |
| WO | 03/053676 | 7/2003 |
| WO | 2007/122010 A2 | 11/2007 |
| WO | 2008/097362 A1 | 8/2008 |
| WO | 2010/028993 A1 | 3/2010 |
| WO | 2011/156577 A1 | 12/2011 |
| WO | 2013/151950 A1 | 10/2013 |

* cited by examiner

FLEXIBLE, LIGHTWEIGHT ANTIBALLISTIC PROTECTION

CROSS-REFERENCE TO RELATED APPLICATIONS

This application is the U.S. National Phase under 35. U.S.C. § 371 of International Application PCT/IB2017/052965, filed May 19, 2017, which claims priority to Belgium Patent Application No. BE2016/5368, filed May 19, 2016. The disclosures of the above-described applications are hereby incorporated by reference in their entirety.

FIELD OF THE INVENTION

The present invention relates to a flexible antiballistic protection with a very low specific gravity. In particular, the invention relates to an antiballistic protection with an optimal comfort for the wearer and an optimal protection against knife and stab wounds as well as bullet and fragment impacts.

BACKGROUND OF THE INVENTION

Security and defence services, such as e.g. police, security officers, soldiers, etc., need protective clothing that meets ever increasing threats. Thereto, stab, cut, fragment and bullet resistant characteristics of the protective clothing should meet ever stringent requirements. To that end, new materials are used to improve the technical specifications.

As such, EP 1 627 719 describes a polyethylene material which is obtained by pressing together a plurality of unidirectionally oriented polyethylene monolayers in a crosswise layered way and in an angle to each other, in which each polyethylene monolayer is composed of ultra-high molecular weight polyethylene and is essentially free from resins. The technology further relates to antiballistic articles comprising or including the polyethylene material and to methods for preparing the material and articles therefrom.

WO 03/053676 describes articles that can resist to several threats. The articles comprise textile layers, synthetic-impregnated textile layers and woven textile layers. The articles can furthermore comprise tightly woven textile layers as an impact plane.

Such protective materials and clothing are especially used during actions with an increased risk of danger, yet limited in time, such as e.g. less than 2 hours. Therefore, the development of materials and clothing was up to now mainly focussed on a sufficient protection. Because of the nature of present threats, security and defence services need a more permanent protection. Antiballistic protection according to the state of the art does however provide for protective materials and clothing that offer a sufficient comport and liberty of movement for the wearer. Such requirements become increasingly important when security and defence agents have to wear such antiballistic protection for a period of several hours, e.g. 4 to 12 hours. Moreover, antiballistic protections according to the state of the art do not offer a sufficient flexibility to fit the body shape of different types of wearers, e.g. chest protection for male wearers or chest protection for female wearers; different size or weight of the wearer, etc. The present invention aims to offer an antiballistic protection with a sufficient flexibility to fit different body shapes.

The present invention aims to offer a solution for one or more of the said problems or defects.

SUMMARY OF THE INVENTION

To this end, the invention offers an antiballistic protection according to claim 1.

In a first aspect, the invention provides for an antiballistic protection comprising a cover with a stab and bullet resistant layer, in which said antiballistic protection has a bending stiffness of maximum 80000 mg·cm measured according to BS 3356 (1990). Preferably, said stab and bullet resistant layer consists of a stab resistant layer of polyamide and a bullet resistant layer of ultra-high molecular weight polyethylene.

The invention offers an increased comfort for the wearer of the antiballistic protection. This is particularly important for situations in which the user has to wear the protection for a relatively prolonged period. Moreover, the antiballistic protection according to the invention offers a very good protection against stab, cut, fragment and bullet wounds. The embodiment thus provides an optimal protection of the vital organs at the chest and possibly the abdomen.

In a second aspect, the invention offers a method for producing an antiballistic protection, comprising the following steps:
   providing a stab resistant layer and a bullet resistant layer;
   connecting said stab resistant layer and said bullet resistant layer; and
   enclosing said stab and bullet resistant layer in a cover.

In this way, a simple method of assembly is provided for the antiballistic protection without, thereby, substantially reducing the stab, cut, fragment and bullet resistant characteristics of the composing materials. Thus, with a minimum amount of material, and accordingly with a minimum weight and a maximum flexibility, an antiballistic protection can be assembled.

In a third aspect, the invention provides for a kit comprising one or more antiballistic protections according to the first aspect of the invention and a piece of clothing with one or more wearing planes for wearing said one or more antiballistic protections.

BRIEF DESCRIPTION OF THE FIGURES DRAWINGS

The explicit characteristics, advantages and objectives of the present invention will become clear for the skilled worker in the technical domain of the invention from the following detailed description of the embodiment of the invention and the attached figures. The figures are only illustrative of the invention, and are in no case limitative of the invention.

FIG. 1 is a schematic illustration of a view of the antiballistic protection 1.

Figure 1:
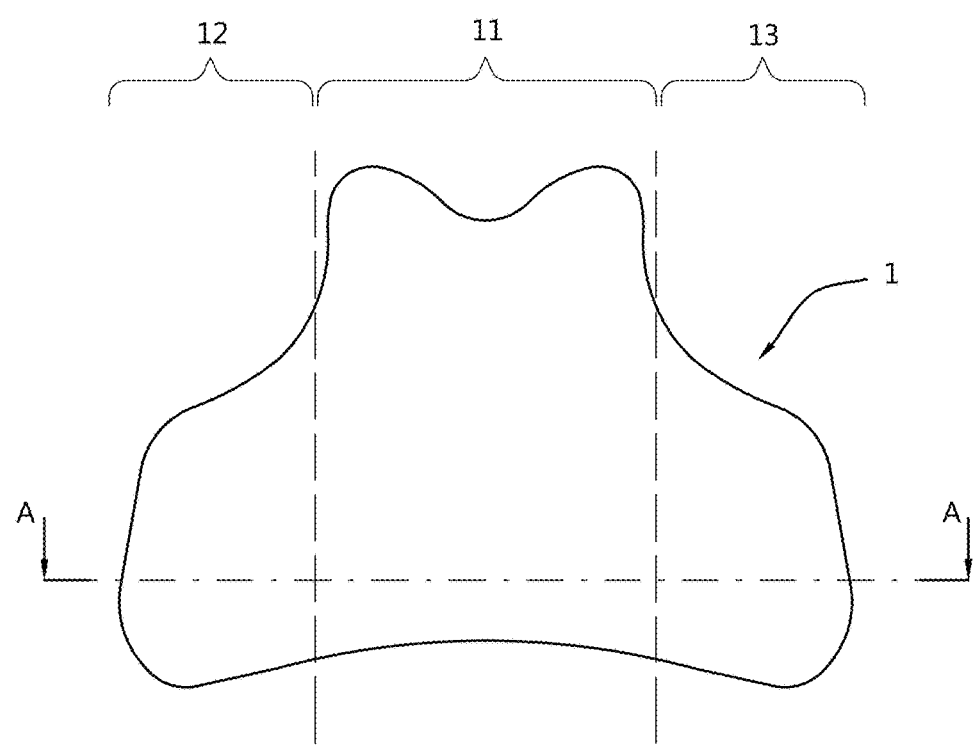
FIGS. 1 to 4 show a simplified illustration of an antiballistic protection according to the present invention.
Figure 2A:
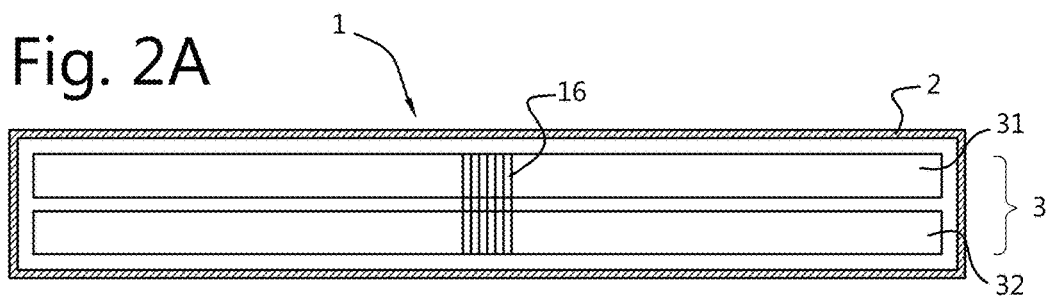
Figure 2B:
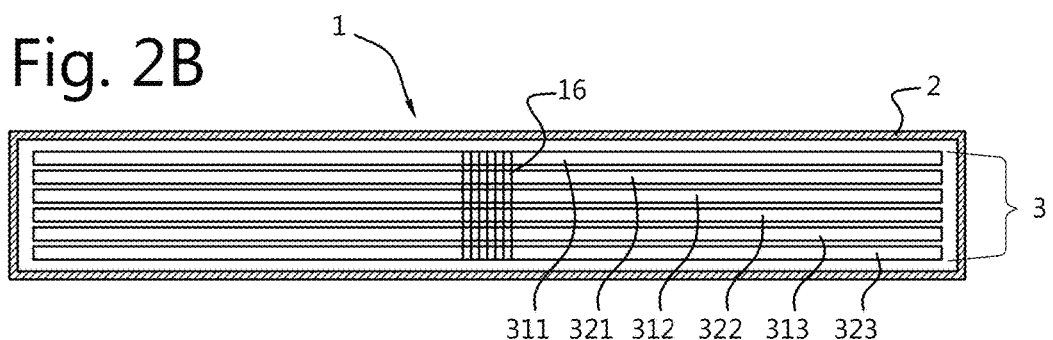
Figure 2C:
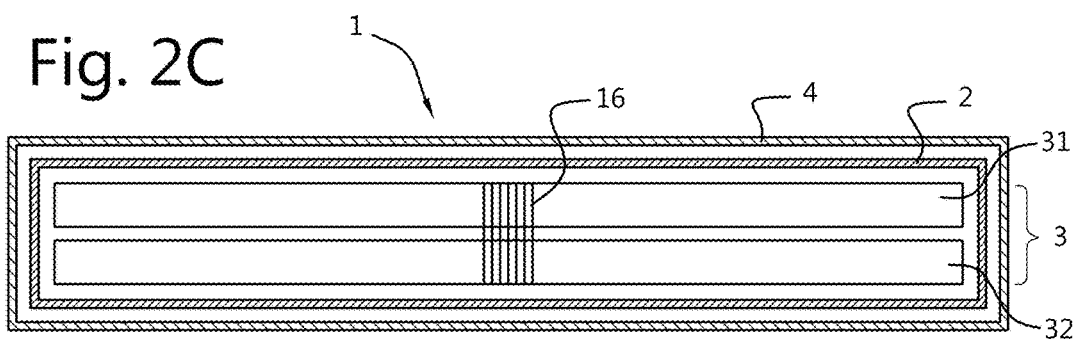
Figure 2D:
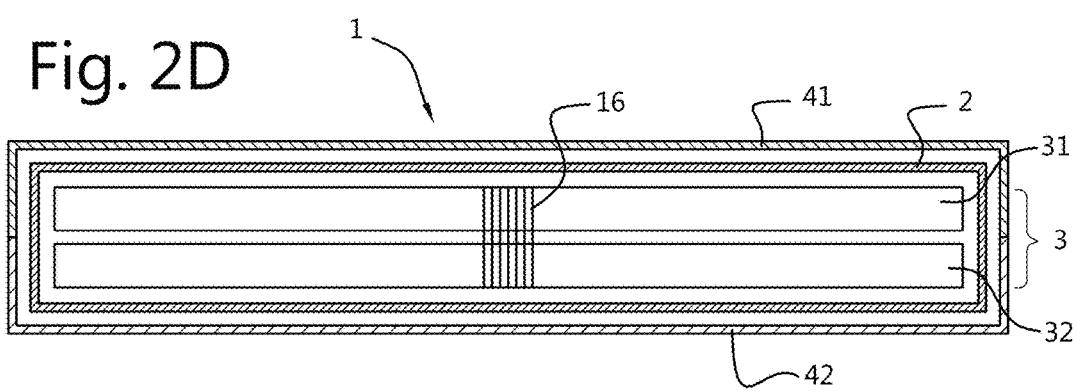

FIG. 2 is a schematic illustration of cross-section A-A, indicated in FIG. 1, according to several embodiments. FIG. 2A shows the cross-section A-A according to the embodiment of FIG. 1. FIG. 2B shows the cross-section A-A according to the embodiment of FIG. 1, in which the stab resistant 31 and bullet resistant 32 layers are provided as alternating stab resistant 311, 312, 313 and bullet resistant 321, 322, 323 layers. FIG. 2C shows the cross-section A-A according to the embodiment of FIG. 1, in which the antiballistic protection is provided with a taser resistant cover 4. FIG. 2D shows the embodiment according to FIG. 2C, in which the taser resistant cover 4 is composed of a conductive front side 41 and a non-conductive rear side 42.

Figure 3A:
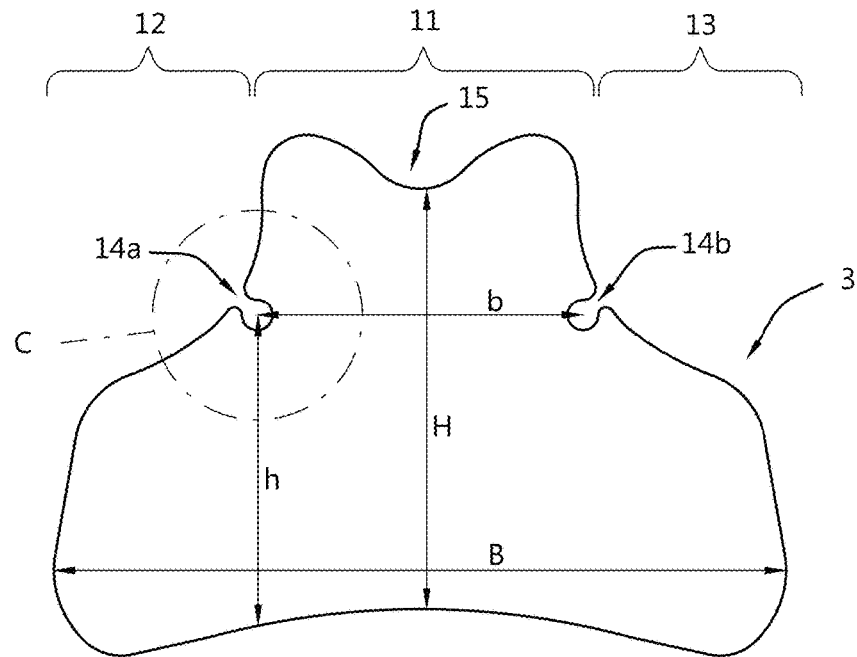
Figure 3B:
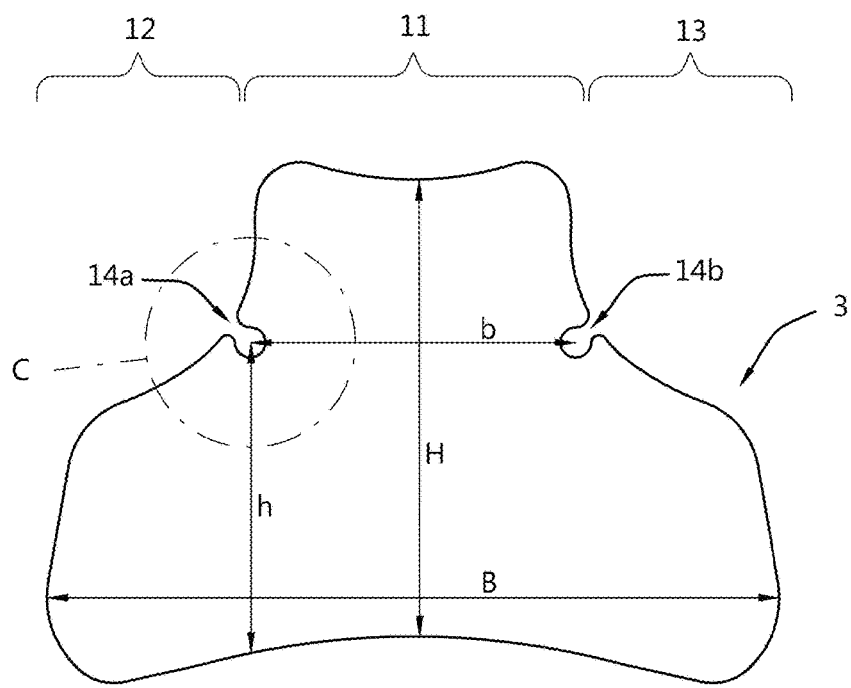
Figure 3C:
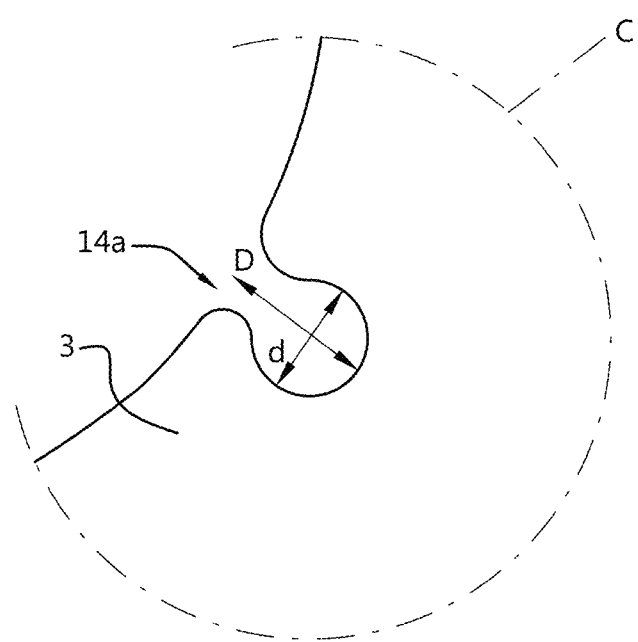

FIG. 3 is a schematic illustration of a stab and bullet resistant layer 3. FIG. 3A shows a stab and bullet resistant layer 3 with neckline 15 as chest protection. FIG. 3B shows a stab and bullet resistant layer 3 as back protection. FIG. 3C shows a detail of cut-out C of FIGS. 3A and 3B.

Figure 4A:
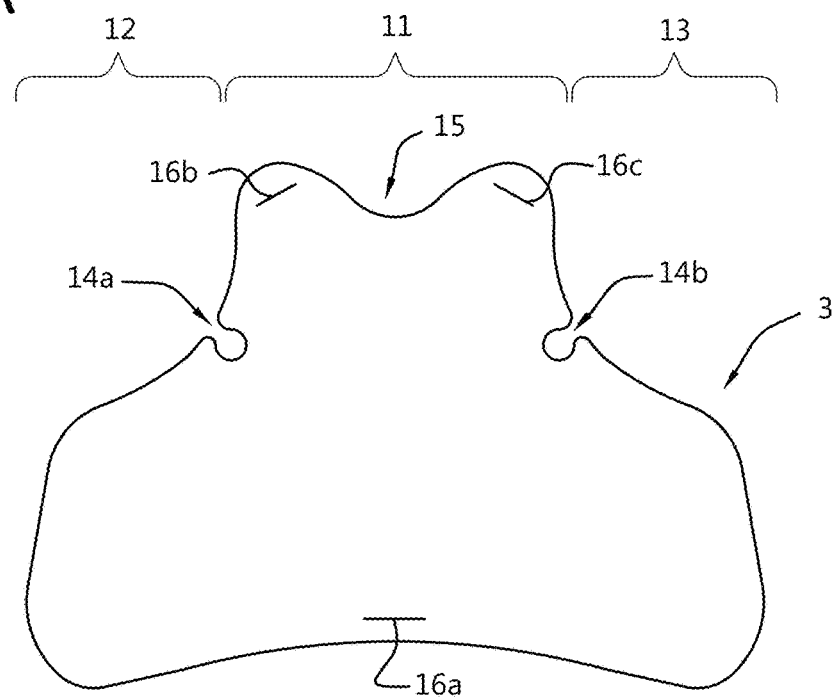
Figure 4B:
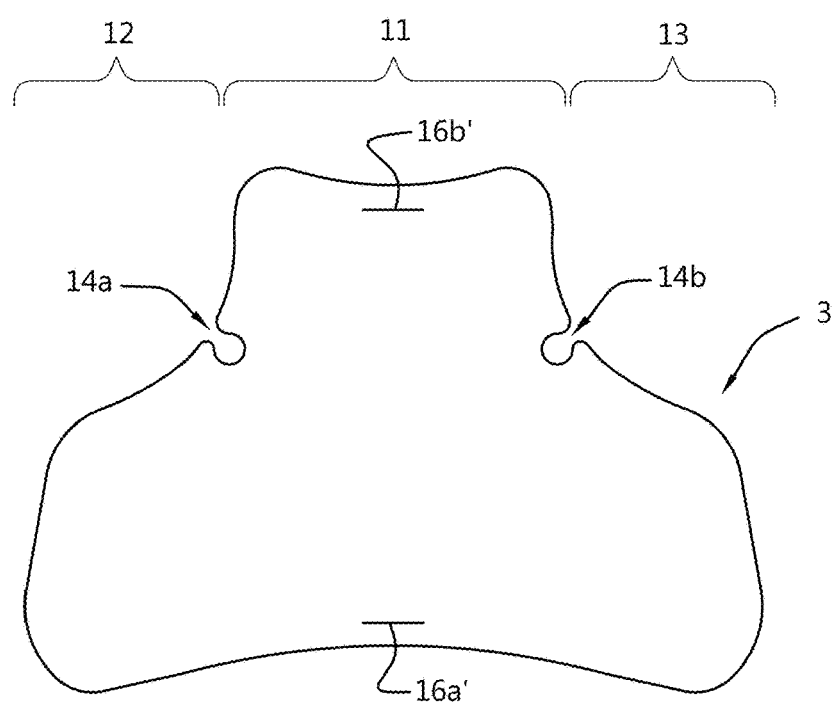

FIG. 4 is a schematic illustration of a stab and bullet resistant layer 3 with indication of seams 16a, 16b and 16c in FIG. 4A and seams 16a' and 16b' in FIG. 4B.

DETAILED DESCRIPTION OF THE INVENTION PREFERRED EMBODIMENTS

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" or "about" are used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" or "about" is used, is itself specified.

The citation of numeric intervals by means of end points includes all integers, fractions and/or real numbers between the end points, including these end points.

In a first aspect, the invention provides for an antiballistic protection comprising a cover with a stab and bullet resistant layer, comprising a stab resistant layer and a bullet resistant layer. The antiballistic protection according to the present invention aims for an increased flexibility for its wearer. This allows for an improved comfort for the wearer, which is in particular important when wearing it during longer periods. Simultaneously, the present invention aims for a lighter weight, which also contributes to an improved comfort for the wearer.

More in particular, the present invention comprises an antiballistic protection according to the first aspect of the invention, in which said antiballistic protection has a bending stiffness of maximum 80000 mg·cm measured according to BS 3356 (1990). A decreased bending stiffness allows for a better bending of the antiballistic protection, as a result of which the wearer has more freedom of movement. This is in particular important when carrying out particular operations or works.

BS 3356 (1990) was measured at a temperature of 20° C. and a relative humidity of 65% at a Cantilever device. A bending stiffness of maximum 80000 mg·cm has the advantage that it offers a good flexibility of the protection, as a result of which a better user comfort is obtained. The protection can thus closely fit to the contours of the body of the user. This is advantageous amongst other things to have the antiballistic protection better fit the breasts of a female user. Preferably, said bending stiffness is smaller than 75000 mg·cm, more preferably smaller than 700000 mg·cm, and still more preferably smaller than 65000 mg·cm. Most preferably, said bending stiffness is situated at 60000 mg·cm, 55000 mg·cm, 50000 mg·cm, 45000 mg·cm or 40000 mg·cm or any value in between.

Preferably, said antiballistic protection is provided with a central chest section 11 with width b and height H and two wing sections 12, 13 with width B and height h. Still preferably, the ratio H/h is situated at about 1.4, 1.5, 1.6, 1.7 or 1.8 or any value in between and the ratio B/b is situated at about 1.7, 1.8, 1.9, 2.0, 2.1 or 2.2 or any value in between. This offers as an advantage a sufficient protection of both the central and the side planes of the body and contributes to a sufficient flexibility of the different planes of the antiballistic protection with respect to each other. This increases the wearing comfort for the user and his/her freedom of movement.

Preferably, said stab and bullet resistant layer comprises a stab resistant layer of polyamide and a bullet resistant layer of ultra-high molecular weight polyethylene.

The term "antiballistic protection" refers to a "protection pad" or a "protective plane", and is appropriate for being included in protective clothing for the protection of a zone requiring protection, such as e.g. the chest.

The cover ensures that the stab and bullet resistant layer can be applied collectively in a simple way in the protective clothing or can be worn in another way. Moreover, the cover provides for a protection of the stab and bullet resistant layer against damage as a result of heat, friction, contact with water, sunlight, etc.

The term "stab resistant layer" should be understood as a synonym for the term "cut resistant layer". The term "stab resistant layer of polyamide" refers to one or more layers of polyamide, preferably a polyamide textile and more preferably a polyamide tissue. Preferably, said polyamide is an aromatic polyamide. Preferably, said polyamide textile is comprised of polyamide yarns from at least 100 dtex and preferably at least 150 dtex and less than 400 dtex and preferably less than 375 dtex. More preferably, said polyamide textile is composed of polyamide yarns with a thickness of maximum 350 dtex, maximum 325 dtex, maximum 300 dtex, maximum 275 dtex, maximum 250 dtex, or even maximum 225 dtex. The inventors have found that the stab resistant protection is however determined by the full thickness of the stab resistant layer, but also surprisingly that a much higher flexibility of the stab resistant layer, and thus also of the complete antiballistic protection, is obtained when a polyamide yarn with low dtex is chosen. Preferably, said polyamide yarn is composed of 180 dtex, 200 dtex, 220 dtex, 240 dtex or 260 dtex, or any value in between. By choosing a polyamide yarn with low dtex value, however with a sufficiently high density of polyamide yarns in order to obtain stab resistant characteristics, a stab resistant layer with high flexibility is obtained. Preferably, said stab resistant layer comprises a plurality of polyamide textile layers, in which each polyamide textile layer is provided with a low surface weight. Preferably, said surface weight is lower than 250 g/m², and more preferably lower than 200 g/m², lower than 175 g/m², lower than 150 g/m², or even lower than 140 g/m², or lower than 130 g/m². If a UHMW polyamide textile layer with a lower surface weight is selected, the number of layers of polyamide textile can be increased in order to obtain sufficient stab resistant protection. A sufficient stab resistant protection can be offered when the total of polyamide textile layers corresponds to a surface weight of 500 to 3000 g/m², preferably of 750 to 2500 g/m², and still more preferably of 1000 to 2000 g/m², and most preferably when the surface weight of the total of UHMW-PE composite laminates is equal to 1100 g/m², 1200 g/m², 1300 g/m², 1400 g/m², 1500 g/m², 1600 g/m², 1700 g/m², or 1800 g/m², or any value in between. The inventors have found that the stab resistant protection is however determined by the full thickness of the stab resistant layer, but also surprisingly that a much higher flexibility of the stab resistant layer, and thus also of the complete antiballistic protection, is obtained when several polyamide textile layers are chosen in which each polyamide textile layer has a minimum surface weight. Still more preferably, said polyamide textile layer is provided as a tissue, in which said polyamide yarns are composed of 180 dtex, 200 dtex, 220 dtex, 240 dtex or 260 dtex, or any value in between, and in which the tissue binding is provided with a density of 200 to 400 end per 10 cm in the longitudinal direction, measured according to DIN EN 1049, and with a density of 200 to 400 picks per 10 cm in the traverse direction, measuring according to DIN EN 1049. Preferably, said polyamide textile is provided as a tissue with 220 to 360 ends per 10 cm, more preferably 240 to 320 ends and still more preferably 260 to 300 ends per 10 cm, or any value in between. Preferably, said polyamide textile is provided as a tissue with 220 to 360 picks per 10 cm, more preferably 240 to 320 picks and still more preferably 260 to 300 picks per 10 cm, or any value in between. Preferably, said polyamide textile is comprised of polyamide yarns with a tensile strength of at least 150 cN/tex, measured according to ASTM D7269, and preferably at least 200 cN/tex and more preferably equal to 210 cN/tex, 220 cN/tex, 230 cN/tex, 240 cN/tex, 250 cN/tex or 260 cN/tex, or any value in between. Still more preferably, said polyamide textile is composed of polyamide yarns with a modulus of at least 5000 cN/tex, measured according to ASTM D7269, and preferably at least 6000 cN/tex and more preferably equal to 6200 cN/tex, 6400 cN/tex, 6600 cN/tex, 6800 cN/tex, 7000 cN/tex, 7200 cN/tex, 7400 cN/tex, 7600 cN/tex, 7800 cN/tex or 8000 cN/tex, or any value in between. A higher tensile strength and a higher modulus contribute to higher stab and cut resistant characteristics. Said cut resistant layer composed of polyamide preferably comprises 5 to 20 polyamide textile layers of 100 to 140 g/m², more preferably 8 to 15 polyamide textile layers of 110 to 130 g/m², and most preferably 10, 11 or 12 polyamide textile layers of 110 to 130 g/m². The use of a plurality of polyamide textile layers, e.g. 11 polyamide textile layers of 120 g/m², has the advantage that a flexible polyamide layer is obtained, contrary to e.g. one single polyamide layer of 1320 g/m².

The term "bullet resistant layer" should be understood as a synonym for the term "fragment resistant layer". The term "bullet resistant layer from ultra-high molecular weight polyethylene" refers to one or more layers of ultra-high molecular weight polyethylene, shortly UHMW-PE layer. Preferably, the UHMW-PE layer is a composite laminate, in which each UHMW-PE layer comprises two single unidirectional layers, preferably mutually perpendicular to each other, which single unidirectional layers preferably are consolidated by means of a rubber-based matrix and which UHMW-PE layer is preferably covered by a protective film. Said bullet resistant layer from ultra-high molecular weight polyethylene preferably comprises a plurality of UHMW-PE composite laminates, in which each UHMW-PE composite laminate is provided with a layer surface weight. Preferably, said surface weight is lower than 150 g/m², and more preferably lower than 140 g/m², lower than 130 g/m², lower than 120 g/m², lower than 110 g/m², lower than 100 g/m², or even lower than 90 g/m². If a UHMW-PE composite laminate with a lower surface weight is selected, the number of layers of UHMW-PE laminate can be increased in order to obtain sufficient antiballistic protection. A sufficient antiballistic protection can be offered when the total of UHMW-PE composite laminates corresponds to a surface weight of 1000 to 5000 g/m², preferably of 2000 to 4000 g/m², and still more preferably of 2500 to 3600 g/m², and most preferably when the surface weight of the total of UHMW-PE composite laminates is equal to 2600 g/m², 2800 g/m², 3000 g/m², 3200 g/m², 3400 g/m², or 3600 g/m², or any value in between. Still more preferably, UHMW-PE composite laminate is selected with a surface density lower than 80 g/m², lower than 70 g/m², lower than 60 g/m², or even lower than 50 g/m². The inventors have found that the antiballistic protection is however determined by the full thickness of the bullet resistant layer, but also surprisingly that a much higher flexibility of the bullet resistant layer, and thus also of the complete antiballistic protection, is obtained when several UHMW-PE layers or laminates are chosen in which each bullet resistant layer of laminate has a minimum surface weight. Said bullet resistant layer from ultra-high molecular weight polyethylene preferably comprises 10 to 100 UHMW-PE layers or laminates of 70 to 90 g/m², more preferably 25 to 50 UHMW-PE layers or laminates of 70 to 90 g/m², and most preferably 30, 35, 40, 45 or 50 UHMW-PE layers or laminates of 70 to 90 g/m², or any value in between. The use of a plurality of UHMW-PE layers, e.g. 40 UHMW-PE layers or laminates of 80 g/m², offers the advantage that a flexible UHMW-PE layer or laminate is obtained, contrary to e.g. one single UHMW-PE layer or laminate of 3200 g/m².

In a preferred embodiment, the present invention provides for an antiballistic protection according to the first aspect of the invention, in which said stab resistant layer is composed of a plurality of polyamide textile layers in which at least one, however preferably all, polyamide textile layers have a surface weight lower than 200 g/m², and in which said bullet resistant layer is composed of a plurality of ultra-high molecular weight polyethylene laminates in which at least one, however preferably all, polyethylene laminates have a surface weight lower than 100 g/m².

In a more preferred embodiment, the present invention provides for an antiballistic protection according to the first aspect of the invention, in which said stab resistant layer is composed of maximum 15 polyamide textile layers in which at least one, however preferably all, polyamide textile layers have a surface weight lower than 150 g/m², and in which said bullet resistant layer is composed of maximum 50 ultra-high molecular weight polyethylene laminates in which at least one, however preferably all, polyethylene laminates have a surface weight lower than 90 g/m². In a still more preferred embodiment, the present invention provides for an antiballistic protection according to the first aspect of the invention, in which said stab resistant layer is composed of 8, 9, 10, 11 or 12 polyamide textile layers in which at least one, however preferably all, polyamide textile layers have a surface weight lower than 100 g/m², 110 g/m², 120 g/m², 130 g/m² or 140 g/m², and in which said bullet resistant layer is composed of 32, 34, 36, 38, 40, 42, 44, 46 or 48 layers ultra-high molecular weight polyethylene laminates in which at least one, however preferably all, polyethylene laminates have a surface weight of 60 g/m², 70 g/m², 75 g/m², 80 g/m², 85 g/m², or 90 g/m².

The stab resistant layer and the bullet resistant layer are preferably combined as 'stab resistant layer on top of a bullet resistant layer' or as 'stab resistant layer between two bullet resistant layers'. More specifically, a plurality of polyamide layers is provided on top of a plurality of UHMW-PE layers; or a plurality of polyamide layers is provided between two bullet resistant layers comprising one or more UHMW-PE layers. Furthermore, embodiments can be provided in which several polyamide layers and several UHMW-PE layers are provided alternately.

In an alternative or an additional embodiment, the present invention provides for an antiballistic protection according to the first aspect of the invention, comprising one or more aramid layers and one or more PE layers, preferably UHMW-PE, characterised in that several aramid and/or PE layers are attached to each other through heat and/or compression (compression-moulding). Preferably, several layers, such as preferably 2, 3, 4, 5 or 6 layers, UHMW-PE are attached to each other by means of heat and compression. Although the provision of one or more compressed UHMW-PE layers can lead to an increased stiffness, such configuration offers an improved antiballistic protection. Consequently, one can consider to work with a lower number of UHMW-PE layers, which in turn has a positive effect on the flexibility and the low weight of the antiballistic protection. Preferably, said antiballistic protection is provided with a bullet resistant layer comprising maximum 10 UHMW-PE laminates, each laminate comprising 2, 3, 4 or 5 UHMW-PE layers. More preferably, the bullet resistant layers provide for maximum 9, maximum 8, maximum 7 or even maximum 6 UHMW-PE laminates. More preferably, at least one or more of said aramid and/or UHMW-PE layers are provided as a unidirectional layer, in which preferably at least one or more of said aramid and PE layers are provided with a different direction with respect to each other. Preferably, the attachment between the different layers is provided mainly in absence of any resins, glues or other adhesives. This has the advantage that a very thin and light antiballistic protection can be obtained.

In a more preferred embodiment, the present invention provides for an antiballistic protection as described in the paragraph above, in which said stab resistant layer is composed of 5 to 20 polyamide textile layers and in which said bullet resistant layer is composed of 1 to 10 ultra-high molecular weight polyethylene laminates, in which each polyethylene laminate is made for attaching two or more polyethylene layers. Preferably, 2, 3, 4, 5 or 6 layers of UHMW-PE are attached to each other into one UHMW-PE laminate. Still more preferably, said layers are attached by means of heat and compression (compression-moulding).

In an alternative or an additional embodiment, the present invention provides for an antiballistic protection according to the first aspect of the invention, comprising a taser resistant layer 4. Such taser resistant layer 4 comprises an electrically conductive coating or film which can be provided at the outside of said antiballistic protection or possibly between the stab resistant layer 31 and the water resistant cover 2. Said electrically conductive coating or film can both be attached to the outside of said antiballistic protection, for example through lamination or coating, or it can constitute a separate layer. Said conductive coatings can comprise a cover, for example provided as a tissue or a knitting—preferably a knitting for a better flexibility—, in which the cover is provided with a conductive coating. Such conductive coating can be provided by a polymer comprising a conductive filling agent, such as for example metal particles, e.g. iron or copper particles, however more preferably, the conductive filling agent comprises carbon particles and/or graphite. For good conductive characteristics, the conductive filling agent in said polymer can be provided in an amount of 5 to 20% in weight. Appropriate polymers comprise, but are not limited to, PTFE, polyurethane, polystyrene, polyamide, polyethylene and similar. Preferably, said polymer provides for a water resistant coating.

In a preferred embodiment, a taser resistant cover 4 is provided as a tissue or a knitting around the waterproof cover 2. More preferably, said taser resistant cover is composed of a first, taser resistant side 41 comprising a conductive layer as described above, and a second, non-taser resistant side 42. More preferably, the non-taser resistant side 42 is comprised a knitting for providing the necessary flexibility, while the taser resistant side 41 can be composed of a more rigid textile.

Said electrically conductive coating or film is provided to protect the user against electric discharges of for example TASER® weapons. Said electrically conductive layer can be composed of for example a textile layer comprising copper fibres. Still preferably, said taser resistant layer is provided in a knitting for fabricating the cover 2 of said antiballistic protection. This offers as an advantage a simplified configuration of the antiballistic protection.

In a preferred embodiment, the invention provides for an antiballistic protection according to the first aspect of the invention, in which said antiballistic protection comprises a central chest section and at least two wing sections. The central chest section is provided for covering the body of the user from the neck to the chest or abdomen. Said wing sections are provided for protecting the chest and/or abdomen against sideways impacts and are provided to extend under the arms of the user. In this way, a maximum protection surface is offered without unnecessary limiting the freedom of movement of the user. FIG. 1 is a schematic illustration of a front view of the antiballistic protection 1. The figure shows a central chest protection 11 with two wing sections 12 and 13.

FIG. 2 is a schematic illustration of cross-section A-A, indicated in FIG. 1. FIG. 2A shows that the antiballistic protection 1 is composed of a protective cover 2 enclosing a stab and bullet resistant layer 3. The stab and bullet resistant layer 3 is composed of a stab resistant layer 31 and a bullet resistant layer 32 that are connected centrally by means of a seam 16. FIG. 2B shows the cross-section A-A according to the embodiment of FIG. 1, in which the stab resistant 31 and bullet resistant 32 layers are provided as alternating stab resistant 311, 312, 313 and bullet resistant 321, 322, 323 layers. FIG. 2C shows the cross-section A-A according to the embodiment of FIG. 1, in which the antiballistic protection is provided with a taser resistant cover 4. FIG. 2D shows the embodiment according to FIG. 2C, in which the taser resistant cover 4 is composed of a conductive front side 41 and a non-conductive rear side 42.

In a preferred embodiment, the invention provides for an antiballistic protection according to the first aspect of the invention, in which one or more recesses are provided along the circumference of said antiballistic protection. Such recesses should be understood as an incision provided at the circumference and towards the centre of the antiballistic protection. The aim of said recesses is to promote a good pliability of several planes of the antiballistic protection with respect to each other. Preferably, said recessions are provided along the circumference of said antiballistic protection at the transition between the central chest section and both wing sections, preferably at a height h of the lower side of said antiballistic protection and at a distance b from each other, as indicated in FIG. 3A and FIG. 3B.

FIG. 3 is a schematic illustration of a stab and bullet resistant layer 3. FIG. 3A shows a stab and bullet resistant layer 3 with neckline 15. Such embodiment is in particular advantageous as a chest protection and offers more freedom of movement at the neck of the user. A chest protection differs from a back protection because a bending movement of a user should be absorbed more. To this end, the neckline 15 in the chest protection should be cut out deeper. FIG. 3B shows a stab and bullet resistant layer 3 with a minimum neckline, which is especially advantageous as a back protection. FIG. 3C shows in more detail cut-out C, indicated in FIGS. 3A and 3B. Cut-out C illustrates in more detail the recesses 14a and 14b, that are preferably provided in a chest protection. Recesses 14a and 14b are meant to improve that mobility of the upper, central chest section 11 with respect to the lower wing sections 12, 13. The recesses are provided with a depth D and a width d, in which the ratio D/d is higher than or equal to 1.0, and preferably higher than 1.1 and more preferably higher than 1.2. Still more preferably, the ratio D/d is situated between 1.2 and 2.5, and more preferably between 1.3 and 2.0, and most preferably at 1.3, 1.4, 1.5, 1.6, 1.7, 1.8 or 1.9, or any value in between. A sufficiently narrow width d with respect to a sufficiently deep depth D of the recess allows for an increased flexibility without unnecessarily limiting the protection for the user. Still preferably, the depth D of said recession with respect to the width B of the antiballistic protection is in a ratio B/D that is about equal to 10/1, 15/1, 20/1, 25/1 or 30/1, or any value in between. A sufficient depth D of recesses 14a and 14b allows for a sufficient flexibility of the different planes of the antiballistic protection with respect to each other. However, the depth D of said recesses cannot be too large in order to be able to guarantee an effective protection of the wearer.

In a preferred embodiment, the invention provides for an antiballistic protection according to the first aspect of the invention, in which said stab resistant layer and said bullet resistant layer are connected under said central chest section. In this way, the respective stab resistant layer and bullet resistant layer can be assembled in a simple way and without causing too much damage to the materials. In a preferred embodiment, the invention provides for an antiballistic protection according to the first aspect of the invention, in which said stab resistant layer and said bullet resistant layer are connected above said central chest section. In case of several polyamide and polyethylene layers, the amount of layers can be assembled to a shape-stable assembly, without unnecessarily reducing the flexibility of the resulting stab and bullet resistant layer.

FIG. 4 is a schematic illustration of a preferred embodiment of a stab and bullet resistant layer 3 with indication of seams 16a, 16b and 16c in the chest protection illustrated in FIG. 4A and seams 16a' and 16b' in the back protection illustrated in FIG. 4B. The lower connection point 16a and 16a' of a stab and bullet resistant layer 3 is preferably provided for centrally. In this way, one connection at the bottom is sufficient for connecting the two assembling layers. In the back protection of FIG. 4B, the upper connection point 16b' is also preferably provided for centrally. However, in the chest protection of FIG. 4A, preferably two connection points 16b and 16c are provided to connect the assembling layers 31 and 32 at the top. To this end, the connection points 16b and 16c are provided at the side and the top of the central chest section, separated by the neck cut-out 15. Such embodiment contributes to an improved flexibility and pliability of the antiballistic protection.

In a preferred embodiment, the invention provides for an antiballistic protection according to the first aspect of the invention, in which said cover is a knitting. Compared to for example a tissue, a knitting has the advantage that the cover is more flexible; this means that a knitting has a natural elasticity compared to a tissue, as a result of which the flexibility of the antiballistic protection is larger. Still preferably, said knitting is made of polyamide yarns. Compared to for example polyester yarns, polyamide yarns have the advantage that the yarns have an improved elasticity, which further contributes to the flexibility of the antiballistic protection. Preferably, said knitting is made of 50 to 200 g/m$^2$, more preferably of 60 to 100 g/m$^2$, and most preferably of 60 g/m$^2$, 70 g/m$^2$, 80 g/m$^2$, 90 g/m$^2$ or 100 g/m$^2$ or any value in between. This offers an optimal protection against damage as a result of friction or heat, without however increasing the weight of the antiballistic protection too much.

In a preferred embodiment, the invention provides for an antiballistic protection according to the first aspect of the invention, in which said cover comprises a watertight coating. This has the advantage that the stab and bullet resistant layer is protected against damage as a result of contact with water. Moreover, such watertight coating has the advantage that the stab and bullet resistant layer does not absorb any water, as a result of which the total weight of the antiballistic protection is not increased unnecessarily. Thus, the antiballistic protection can also be worn in aqueous circumstances. Preferably, said coating is comprised of polyurethane. Polyurethane offers a good adhesion with the polyamide of the knitting. Preferably, said coating is applied in an amount of 50 to 200 g/m$^2$, more preferably of 60 to 100 g/m$^2$, and most preferably of 60 g/m$^2$, 70 g/m$^2$, 80 g/m$^2$, 90 g/m$^2$ or 100 g/m$^2$ or any value in between. Such coating offers a sufficiently waterproof protection, without unnecessarily increasing the weight of the antiballistic protection too much.

In a preferred embodiment, the invention provides for an antiballistic protection according to the first aspect of the invention, in which said bullet resistant layer has a specific surface density of 2.0 kg/m$^2$ to 4.5 kg/m$^2$. Preferably, said bullet resistant layer is in accordance with the description above. Still preferably, said bullet resistant layer has a specific surface density of 2.5 kg/m$^2$ to 4.0 kg/m$^2$, and still more preferably of 3.0 kg/m$^2$ to 3.5 kg/m$^2$. In this way, optimal bullet resistant characteristics are obtained without hindering the comfort of the wearer because of a too rigid antiballistic protection.

In a preferred embodiment, the invention provides for an antiballistic protection according to the first aspect of the invention, in which said stab resistant layer has a specific surface density of 1.0 kg/m$^2$ to 2.5 kg/m$^2$. Preferably, said stab resistant layer is in accordance with the description above. Still preferably, said stab resistant layer has a specific surface density of 1.0 kg/m$^2$ to 1.5 kg/m$^2$, and still more preferably of 1.2 kg/m$^2$ to 1.4 kg/m$^2$. In this way, optimal stab resistant characteristics are obtained without hindering the comfort of the wearer because of a too rigid antiballistic protection.

In a preferred embodiment, the invention provides for an antiballistic protection according to the first aspect of the invention, in which the ratio of specific surface densities of said bullet resistant layer to said stab resistant layer is situated between 3:2 and 7:2. Preferably, the ratio of specific surface densities of said bullet resistant layer to said stab resistant layer is situated between 3:2 and 5:2. In this way, an optimum can be found between optimal stab and bullet resistant characteristics, without thereby reducing the flexibility of the antiballistic protection and the user comfort in any way.

In a preferred embodiment, the invention provides for an antiballistic protection according to the first aspect of the invention, in which said antiballistic protection has a specific surface density of less than 7.5 kg/m$^2$. Preferably, said antiballistic protection has a specific surface density of less than 6.0 kg/m$^2$, and more preferably less than 5.0 kg/m$^2$. A sufficiently low weight of the antiballistic protection contributes to the wearing comfort of the user. Still more preferably, said antiballistic protection has a specific surface density of more than 2.0 kg/m², more preferably more than 3.0 kg/m² and still more preferably more than 3.5 kg/m². A too low weight of the antiballistic protection cannot or insufficiently guarantee the stab and bullet resistant characteristics.

In a preferred embodiment, the invention provides for an antiballistic protection according to the first aspect of the invention, in which said antiballistic protection is provided with a neckline. Such neckline is advantageous for an improved mobility of the user at the level of the head and neck when the antiballistic protection is worn.

In a second aspect, the invention offers a method for producing an antiballistic protection, comprising the following steps:
   providing a stab resistant layer and a bullet resistant layer;
   connecting said stab resistant layer and said bullet resistant layer; and
   enclosing said stab and bullet resistant layer in a cover.

Preferably, said invention provides for the above-mentioned method, in which said stab resistant and said bullet resistant layer are provided according to the composition of an antiballistic protection according to the first aspect of the invention.

Preferably, the invention provides for the above-mentioned method, in which said antiballistic protection is provided with a bending stiffness of maximum 80000 mg·cm, measured according to BS 3356 (1990).

In this way, a simple method of assembly is provided for the antiballistic protection without, thereby, substantially reducing the stab, cut, fragment and bullet resistant characteristics of the composing materials. Thus, with a minimum amount of material, and thus with a minimum weight and a maximum flexibility, an antiballistic protection can be assembled. Preferably, the stab resistant layer and the bullet resistant layer are chosen according to specifications such as explained for the antiballistic protection according to the first aspect of the invention.

In a preferred embodiment, the invention provides for a method according to the second aspect of the invention, comprising the following steps:
   providing a stab resistant layer and a bullet resistant layer with a central chest section and at least two wing sections;
   connecting said stab resistant layer and said bullet resistant layer at at least one contact point at the bottom of said central chest section and at one or more contact points at the top of said central chest section, as a result of which a stab and bullet resistant layer is obtained; and
   enclosing said stab and bullet resistant layer in a cover.

Preferably, said stab resistant layer is composed of polyamide and said bullet resistant layer is composed of ultra-high molecular weight polyethylene. The choice for one single connection point, e.g. a seam, for attaching the stab resistant layer and the bullet resistant layer has the advantage that only a minimal damage is caused to the stab resistant layer and the bullet resistant layer. Such connection points are in particular advantageous when the polyamide layer and the UHMW-PE layer are composed of a multitude of single layers, in which the single layers do not have sufficient internal strength or stiffness to remain in position independently. Because a multitude of films are fixed with respect to each other, a certain shape-stability is created without thereby hindering the flexibility and the pliability of the assembly.

In a preferred embodiment, the invention provides for a method according to the second aspect of the invention, comprising the step of attaching the two or more ultra-high molecular weight polyethylene layers to a ultra-high molecular weight polyethylene laminate. Preferably, said bullet resistant layer is provided with 1 to 10 ultra-high molecular weight polyethylene laminates, in which each polyethylene laminate is fabricated for attaching two or more polyethylene layers. Preferably, 2, 3, 4, 5 or 6 layers of UHMW-PE are attached to each other into one UHMW-PE laminate. Still more preferably, said layers are attached by means of heat and compression (compression-moulding). In an alternative embodiment, said layers of UHMW-PE are attached by means of adhesives.

In a preferred embodiment, the invention provides for a method according to the second aspect of the invention, comprising the step of closing said cover in a waterproof manner. Such waterproof is preferably made by welding along the circumference of the confectioned cover. The solidified polymer mass thus becomes waterproof. Such welding can moreover be applied in a simple, quick and reliable manner by means of existing process techniques.

In a third aspect, the invention provides a kit comprising one or more antiballistic protections according to the first aspect of the invention and a piece of clothing with one or more wearing planes for wearing said one or more antiballistic protections, preferably comprising an antiballistic chest protection and an antiballistic back protection. Such kit allows to offer the corresponding antiballistic protection to a user, along with appropriate clothing that is adapted for wearing the one or more antiballistic protections.

EXAMPLE

The invention will now be illustrated by means of a most preferred embodiment, without however limiting the invention thereto.

An antiballistic protection according to the invention is provided with a stab and bullet resistant layer comprising (i) a stab resistant layer comprising 11 textile layers of aromatic polyamide, each layer comprising a polyamide tissue of 120 g/m² and 280 E/10 cm both in warp and weft direction; and (ii) a bullet resistant layer comprising 40 layers of UHMWE-PE layers of 80 g/m², in which each UHMW-PE layer is a tissue-reinforced composite laminate comprising two single layers of unidirectional oriented PE layers that are mutually crossed in 90° and that are consolidated with a rubber-based matrix and protected with a protective film. The stab resistant layer has a bending stiffness of 681 mg·cm in the warp direction and >5333 mg·cm in the weft direction, as a result of which a bending stiffness of >1906 mg·cm is obtained for the assembly, in which the bending stiffness has been measured according to BS 3356 (1990). The bullet resistant layer has a bending stiffness of 2770 mg·cm in the warp direction and 3150 mg·cm in the weft direction, as a result of which a bending stiffness of 2950 mg·cm is obtained for the assembly, in which the bending stiffness has been measured according to BS 3356 (1990).

The stab and bullet resistant layers are stitched with a seam of 1 cm to 1.5 cm at the edge of the layers and at the positions 16a, 16b and 16c indicated in FIG. 4A for a chest protection and at the positions 16a' and 16b' indicated in FIG. 4B for a back protection. The assembled stab and bullet resistant layer is subsequently included in a polyamide knitting of 80 g/m² with a waterproof polyurethane coating of 80 g/m². The polyamide knitting is welded along the circumference, in which the formed seam is formed towards the inside, and once the assembled stab and bullet resistant layer has been inserted, welded. The knitting has a bending stiffness of 152 mg·cm in the warp direction and of 208 mg·cm in the weft direction, as a result of which a bending stiffness of 178 mg·cm is obtained for the assembly, in which the bending stiffness has been measured according to BS 3356 (1990).

The antiballistic protection has as a whole a bending stiffness of maximum 59000 mg·cm, in which the bending stiffness is measured according to BS 3356 (1990).

The described antiballistic protection meets the following requirements for bullet resistant protection:

HOSDB 2007 standard level HG1A special
- 9 mm FMJ DM 11 A1B1 (365+1−10 m/s)
- 9 mm HP P9HST1 (365+1−10 m/s)
- 0.357 Mag R 357M3 (390+1−10 m/s)

HOSDB 2007 standard level HG2 special with max 44 mm bfs
- 9 mm FMJ DM 11 A1B1 (430+1−10 m/s)
- 9 mm HP P9HST1 (430+1−10 m/s)
- 0.357 Mag R 357M3 (455+1−10 m/s) HOSD8 2007 standard special
- 9 mm QD PEP 11/s (450+1−15 m/s)
- 9 mm ACTION NP (440+1−15 m/s) NIJ 0101.04 standard level II special
- 9 mm FMJ Remington (367+1−9 m/s)
- 0.357 Mag R 357M3 (436+1−9 m/s) NIJ 0101.04 standard level IIIA special
- 9 mm FMJ Remington (436+1−9 m/s)
- 0.44 Mag SJHP Remington (436+1−9 m/s), 0.44 Mag SJHP without bfs evaluation NIJ 0101.04 standard level special
- 9 mm QD PEP 11/s (450+1−15 m/s)
- 9 mm Makarov (310+1−20 m/s)
- 9 mm DM 41 (360+1−10 m/s)
- 7.62×25 Tokarev FMJ-LC (440+1-20 m/s)
- 12×70 Brenneke Rottweil (+/−400 m/s), 12×70 Brenneke without bfs evaluation VPAM APR 2006 standard level SK1 special
- 9 mm DM 41 (415+1−10 m/s)+contact shot
- 9 mm QD PEP 11/s (460+1−10 m/s)+contact shot
- 9 mm ACTION 4 (460+1−10 m/s)+contact shot The described antiballistic protection meets the following requirements for fragment resistant protection:

V50 STANAG 2920 fsp 1.1 g (17 granules)
- V50=620 m/s
- V50=633 m/s

The described antiballistic protection meets the following requirements for cut resistant protection:

NIJ 0115.00 standard level
KR1 special and KR2 special (S1/G knife)
- KR1 level at 24 and 36 joules energy
- KR2 level at 33 and 50 joules energy HOSDB 2007 standard level KR special (P1B knife)
- KR level at 9 and 18 joules energy The described antiballistic protection meets the following requirements for stab resistant protection:

HOSDB 2007 standard level SP1
- SP1 level at 24 joules energy

HOSDB 2007 standard level SP2
- SP2 level at 33 joules energy

What is claimed is:

1. An antiballistic protection comprising a cover with a stab and bullet resistant layer, and in which said antiballistic protection comprises a central chest section and at least two wing sections, whereby said stab and bullet resistant layer is composed of a stab resistant layer of polyamide and a bullet resistant layer of ultra-high molecular weight polyethylene, wherein said stab resistant layer is composed of a plurality of polyamide textile layers in which at least one polyamide textile layer has a surface weight lower than 200 g/m², and in which said bullet resistant layer is composed of 10 to 100 ultra-high molecular weight polyethylene laminates with surface weight of 70 to 90 g/m².

2. The antiballistic protection according to claim 1, wherein said stab resistant layer and said bullet resistant layer are connected at the bottom of said central chest section.

3. The antiballistic protection according to claim 1, wherein said stab resistant layer and said bullet resistant layer are connected at the top of said central chest section.

4. The antiballistic protection according to claim 1, wherein said cover is a interwoven.

5. The antiballistic protection according to claim 1, wherein said stab resistant layer and said bullet resistant layer are provided as alternating stab resistant and bullet resistant layers.

6. The antiballistic protection according to claim 1, provided with a taser resistant protection.

7. The antiballistic protection according to claim 6, wherein said taser resistant protection is provided as a cover, and said cover is provided with a first, conductive side with taser resistant characteristics and a second, non-conductive side without taser resistant characteristics.

8. The antiballistic protection according to claim 7, wherein said conductive side with taser resistant characteristics is provided as a textile layer with a waterproof polymer coating comprising a conductive filling agent.

9. The antiballistic protection according to claim 8, wherein said conductive filling agent is composed of carbon and said conductive filling agent is provided in an amount of 5 to 20% in weight.

10. The antiballistic protection according to claim 8, wherein the conductive filling agent is carbon.

11. The antiballistic protection according to claim 1 wherein said stab and bullet resistant layer is provided with a neckline and at least two recesses provided along the circumference of said stab and bullet resistant layer.

12. A method for fabricating an antiballistic protection, comprising the following steps:
providing a stab resistant layer composed of a plurality of polyamide textile layers in which at least one polyamide textile layer has a surface weight lower than 200 g/m² and a bullet resistant layer composed of 10-100 of ultra-high molecular weight polyethylene laminates, with surface weight of 70 to 90 g/m² in which at least one polyethylene laminate has a surface weight lower than 100 g/m², said stab resistant layer and said bullet resistant layer having a central chest section and at least two wing sections;
connecting said stab resistant layer and said bullet resistant layer at least one contact point at the bottom of said central chest section and at one or more contact points at the top of said central chest section, as a result of which a stab and bullet resistant layer is obtained; and
enclosing said stab and bullet resistant layer in a cover.

13. The method according to claim 12, comprising the step of attaching two or more ultra-high molecular weight polyethylene layers into an ultra-high molecular weight polyethylene laminate.

14. A kit comprising one or more antiballistic protections according to claim 1 and a piece of clothing with one or more wearing planes for wearing said one or more antiballistic protections.

15. The antiballistic protection according to claim 8, wherein the conductive filling agent is a carbon-containing conductive filling agent.

16. The Antiballistic protection according to claim 1, wherein the 10 to 100 ultra-high molecular weight polyethylene laminates has not been consolidated to a single ultra-high molecular weight layer or laminate.

\* \* \* \* \*